(12) United States Patent
Teramoto et al.

(10) Patent No.: US 6,654,535 B2
(45) Date of Patent: Nov. 25, 2003

(54) POLYIMIDE OPTICAL WAVEGUIDE (75) Inventors: Miyuki Teramoto, Takatsuki (JP); Naoki Nishida, Kusatsu (JP); Takuji Hatano, Suita (JP)

(73) Assignee: Minolta Co., Ltd., Osaka (JP)

( * ) Notice: Subject to any disclaimer, the term of this patent is extended or adjusted under 35 U.S.C. 154(b) by 38 days.

(21) Appl. No.: 09/948,043

(22) Filed: Sep. 7, 2001

(65) Prior Publication Data
US 2002/0051614 A1 May 2, 2002

(30) Foreign Application Priority Data
Sep. 13, 2000 (JP) .................................. 2000-277614

(51) Int. Cl.[7] ................................................ G02B 6/10
(52) U.S. Cl. ........................................ 385/132; 385/142
(58) Field of Search ................................ 385/129, 130, 385/131, 132, 141, 142, 143, 144, 145

(56) References Cited

U.S. PATENT DOCUMENTS

| | | | | |
|---|---|---|---|---|
| 5,108,201 A | * | 4/1992 | Matsuura et al. | 385/143 |
| 5,649,045 A | * | 7/1997 | Fjare et al. | 385/145 |
| 6,047,098 A | * | 4/2000 | Sagawa et al. | 385/141 |
| 6,100,371 A | * | 8/2000 | Suh et al. | 528/353 |
| 6,229,949 B1 | * | 5/2001 | Ido et al. | 385/145 |

FOREIGN PATENT DOCUMENTS

JP 9-21920 1/1997

* cited by examiner

*Primary Examiner*—Euncha Cherry
(74) *Attorney, Agent, or Firm*—Burns, Doane, Swecker & Mathis, LLP (57) ABSTRACT

An optical waveguide is produced by forming on a substrate a waveguide layer and/or a clad layer containing, as their main ingredient, polyimide with a fluorine substitution rate of 30% or higher (thus as a fluorinated polyimide layer), with a primer layer laid in between that contains, as its main ingredient, polyimide with a fluorine substitution rate of 10% or lower (including 0%). This improves adherence of the fluorinated polyimide layer to the substrate and prevents the fluorinated polyimide layer from peeling off the substrate. For more effective prevention of such peeling-off and of warping of the substrate, the primer layer is preferably formed to have a thickness of 0.1 to 20 μm. The primer layer may contain a coupling agent.

26 Claims, 4 Drawing Sheets

POLYIMIDE OPTICAL WAVEGUIDE

This application is based on Japanese Patent Application No. 2000-277614 filed on Sep. 13, 2000, the contents of which are hereby incorporated by reference.

BACKGROUND OF THE INVENTION

1. Field of the Invention

The present invention relates to an optical waveguide, and more particularly to an optical waveguide having waveguide and clad layers made of fluorinated polyimide.

2. Description of the Prior Art

Polyimide has been widely used as material for interlayer isolation films in semiconductor devices and for other uses, but has rarely been used as material for waveguides because of its poor optical transparency. It has been found, however, that substituting fluorine atoms for about 30% or more of hydrogen atoms in polyimide markedly improves its optical transparency toward light in the visible range. Moreover, in the first place, polyimide is excellent in heat resistance, and can be soldered on the surface of a laser or photoreceptor device. For these desirable properties, polyimide has recently been in increasingly wide use as optical material.

However, a fluorinated polyimide layer (i.e. a layer containing fluorinated polyimide as its main ingredient) is poor in adherence to a substrate, and therefore, when an optical waveguide is diced into chips, the fluorinated polyimide layer often peels off the substrate at the edges of the chips. In particular, in high-temperature, high-humidity environments, such peeling-off is so striking that the fluorinated polyimide layer sometimes separates completely from the substrate. For this reason, it has been proposed to prevent a fluorinated polyimide layer from peeling off a substrate by laying a coupling agent layer between the fluorinated polyimide layer and the substrate, or by increasing the surface roughness of the substrate. These treatments, however, have been unable to offer a satisfactory solution to date.

SUMMARY OF THE INVENTION

An object of the present invention is to provide an optical waveguide having a fluorinated polyimide layer with improved adherence to a substrate so that the fluorinated polyimide layer is less prone to peel off the substrate.

To achieve the above object, according to one aspect of the present invention, an optical waveguide is provided with: a substrate; a primer layer formed on the substrate; and a waveguide layer formed on the primer layer. Here, the primer layer contains as the main ingredient thereof polyimide with a fluorine substitution rate of 10% or lower (including 0%) and the waveguide layer contains as the main ingredient thereof polyimide with a fluorine substitution rate of 30% or higher.

This arrangement improves the adherence of the waveguide layer to the substrate, and thereby prevents the waveguide layer from peeling off the substrate. In the present specification, the fluorine substitution rate denotes the rate at which fluorine atoms are substituted for hydrogen atoms in polyimide.

According to another aspect of the present invention, an optical waveguide is provided with: a substrate; a primer layer formed on the substrate; and a clad layer formed on the primer layer and having a waveguide layer. Here, the primer layer contains as the main ingredient thereof polyimide with a fluorine substitution rate of 10% or lower (including 0%) and the waveguide layer contains as the main ingredient thereof polyimide with a fluorine substitution rate of 30% or higher.

This arrangement improves the adherence of the clad layer to the substrate, and thereby prevents the clad layer from peeling off the substrate.

According to another aspect of the present invention, a method of manufacturing an optical waveguide includes: a step of forming a primer layer on a substrate; a step of forming a lower clad layer on the primer layer; and a step of forming a waveguide layer selectively on the lower clad layer. Here, the primer layer contains as the main ingredient thereof polyimide with a fluorine substitution rate of 10% or lower (including 0%) and the lower clad layer and the waveguide layer contain as the main ingredient thereof polyimide with a fluorine substitution rate of 30% or higher.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Studying in many ways why a fluorinated polyimide layer peels off a substrate, the inventors of the present invention ascertained that one of the leading causes is a difference between thermal expansion coefficients between the fluorinated polyimide and the substrate. Specifically, if there is a large difference in thermal expansion coefficients between the fluorinated polyimide and the substrate, distortion develops at the interface between the fluorinated polyimide layer and the substrate at the time of heat treatment for resin curing or in other high-temperature environments, leading to peeling-off. The inventors also ascertained that, the higher the fluorine content of the fluorinated polyimide used, the poorer its adherence to the substrate, and thus the more easily it peels off the substrate.

With these findings in mind, the inventors decided to prevent peeling-off by forming a primer layer between the fluorinated polyimide layer and the substrate, and investigated materials for the primer layer that meet the following requirements: (1) to minimize the distortion that develops at the interface due to a difference in thermal expansion coefficients, the primer layer should have a thermal expansion coefficient somewhere between that of the fluorinated polyimide layer and that of the substrate and closer to the former than to the latter; (2) the primer layer should exhibit good adhesion to the substrate; and (3), considering that the fluorinated polyimide layer is cured at about 150 to 390° C., the primer layer should be resistant to heat up to 350° C. or higher, preferably up to 400° C. or higher.

This investigation revealed that polyimide with a fluorine substitution rate of 10% or lower meets the aforementioned requirements, which finding led the inventors to make the present invention. That is, the distinctive feature of an optical waveguide embodying the present invention is that it is produced by forming, on a substrate, a waveguide layer and/or a clad layer containing, as their main ingredient, polyimide with a fluorine substitution rate of 30% or higher (hereinafter these layers will be referred to also as the "fluorinated polyimide layer"), with a primer layer laid in between that contains, as its main ingredient, polyimide with a fluorine substitution rate of 10% or lower (including 0%).

As the material for the primer layer formed between the fluorinated polyimide layer and the substrate, polyimide that has not undergone fluorine substitution is most suitable from the viewpoint of adherence. However, through the experiments conducted by the inventors of the present invention, of which the results will be described later, it was confirmed that fluorinated polyimide with a fluorine substitution rate of 10% or lower provides satisfactory adhesion between the fluorinated polyimide layer and the substrate in practical terms. This is why, in an optical waveguide embodying the present invention, the upper limit of the fluorine substitution rate of the polyimide used as the main ingredient of the primer layer is set at 10%. A further preferred upper limit of the fluorine substitution rate here is 5%.

Moreover, polyimide with a fluorine substitution rate of 10% or lower absorbs light well; it thus serves to absorb the light that has failed to enter the waveguide layer and leaked into the clad layer and thereby suppress light that exits from elsewhere other than the waveguide layer.

Polyimide with a fluorine substitution rate of 10% or lower can be synthesized, for example, through cyclic polycondensation of tetracarboxylic acid dianhydride and diamine. In the present invention, it is possible to use a single type of polyimide or a copolymer of two or more types of polyimide. The fluorine substitution rate of polyimide can be adjusted by suitably selecting the type or types of compound used and, in the case of a copolymer, also by suitably determining the compounding ratio. Among commercially available types of polyimide with a fluorine substitution rate of 10% or lower, preferred types are those lined up in the "PIQ" series (for example, "PIX-1400") manufactured by HD MicroSystems L.L.C.

Examples of tetracarboxylic acid dianhydride that can be used in the aforementioned synthesis include: 2,2-bis(3,4-dicarboxyphenyl)propane dianhydride; 1,4-bis(3,4-dicarboxyphenoxy)benzene dianhydride; 4,4'-oxydiphthalic acid dianhydride; pyromellitic acid dianhydride; 3,3',4,4'-benzophenonetetracarboxylic acid dianhydride; 1-methyl-2,3,5,6-benzenetetracarboxylic acid dianhydride; compounds obtained by substituting fluorine atoms for part of the hydrogen atoms in these compounds; and the like.

Examples of diamine that can be used in the aforementioned synthesis include: 4,4'-oxydianiline; 3,4'-oxydianiline; 2,4'-oxydianiline; 2,2'-dimethyl-4,4'-diaminobiphenyl; m-phenylenediamine; bis(4-aminophenyl)ether; 1,1-bis(4-amonophenyl)-1-phenyl-ethane; [1,1-bis[4-(4-aminophenoxy)phenyl]-1-phenyl-ethane]; 3,3'-diaminodiphenylsulfon; 4,4'-diaminodiphenylsulfon; 4,4'-methylenedianiline; 2,2-bis[4-(aminophenoxy)phenyl]propane; 2,2-bis(3-amino-4-hydroxyphenyl)propane; 2,2-bis(4-aminophenyl)propane; compounds obtained by substituting fluorine atoms for part of the hydrogen atoms in these compounds; and the like.

The thickness of the primer layer is determined suitably in consideration of its material and the contact area involved. In typical optical waveguides, a preferred range of its thickness is from 0.1 to 20 μm. With a thickness of less than 0.1 μm, the primer layer does not satisfactorily exert the effect of alleviating the distortion accompanying heat-induced expansion, and thus does not provide satisfactory adhesion. On the other hand, with a thickness of more than 20 μm, the primer layer, when cured, contracts so much that an unduly large warp is likely to develop in the substrate. A further preferred range of the thickness of the primer layer is from 1 to 2 μm.

To enhance the adhesion between the primer layer and the substrate, a coupling agent may be added to the primer layer. In this case, the content of the coupling agent is suitably determined in consideration of its type and the contact area involved. The coupling agent used may be of any conventionally known type; it is possible to use, for example, "PIQ-COUPLER" manufactured by HD MicroSystems L.L.C.

To further enhance the adhesion between the primer layer and the substrate, another means may be used in combination; for example, it is possible to additionally form a coupling layer between the primer layer and the substrate, or increase the surface roughness of the substrate.

The primer layer may be formed by any conventionally known process such as spin coating or dip coating, a particularly preferred process being spin coating from the viewpoint of the thickness uniformity and controllability it offers. For example, spin coating is performed, preferably, in the following manner: first, a first layer is formed by spin coating; then this layer, made of polyimide, is cured by heat treatment under predetermined conditions; then the next layer is formed by spin coating again; then this layer is cured by heat treatment; in this way, these steps are repeated a necessary number of times.

Next, the fluorinated polyimide layer that is formed using polyimide with a fluorine substitution rate of 30% or higher on the substrate with the primer layer laid in between will be described. The reason that, in the present invention, the fluorinated polyimide layer is made of polyimide with a fluorine substitution rate of 30% or higher is that polyimide with a fluorine substitution rate below 30% cannot be used as optical material for its poor optical transparency.

As in the synthesis of the polyimide described earlier, polyimide with a fluorine substitution rate of 30% or higher can be synthesized, for example, through cyclic polycondensation of tetracarboxylic acid dianhydride and diamine. In the present invention, it is possible to use a single type of polyimide or a copolymer of two or more types of polyimide. The fluorine substitution rate of polyimide can be adjusted by suitably selecting the type or types of compound used and, in the case of a copolymer, also by suitably determining the compounding ratio. Examples of commercially available types of polyimide with a fluorine substitution rate of 30% or higher include those lined up in the "OPI" series manufactured by Hitachi Chemical Co., Ltd.

As tetracarboxylic acid dianhydride and diamine that can be used to synthesize fluorinated polyimide here, it is possible to use compounds obtained by subjecting to fluorine substitution those enumerated for the synthesis of the polyimide described earlier. A particularly preferred example of tetracarboxylic acid dianhydride is 2,2-bis(3,4-dicarboxyphenyl)hexafluoropropane dianhydride (hereinafter referred to also as "6FDA"). On the other hand, particularly preferred examples of diamine are 4,4'-oxydianiline (hereinafter referred to also as "ODA"), 2,2'-bis(trifluoromethyl)-4,4'-diaminobiphenyl (hereinafter referred to also as "TFDB").

The substrate used in an optical waveguide embodying the present invention may be made of any material as long as it withstands the heat treatment (at about 400° C.) performed to cure the polyimide of which the primer layer is made. Preferable examples of the substrate include those made of silicon or glass.

Figure 1:
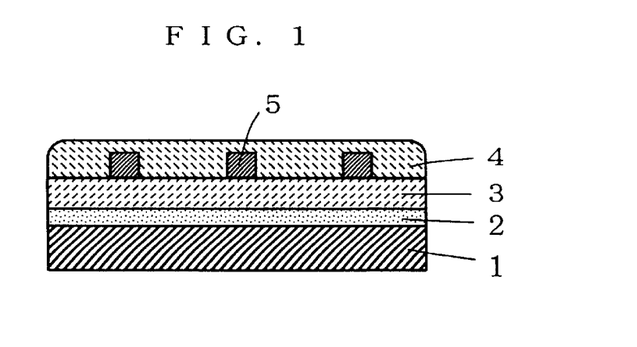
FIG. 1 is a sectional view of an example of a first type of optical waveguide embodying the invention.
Figure 2:
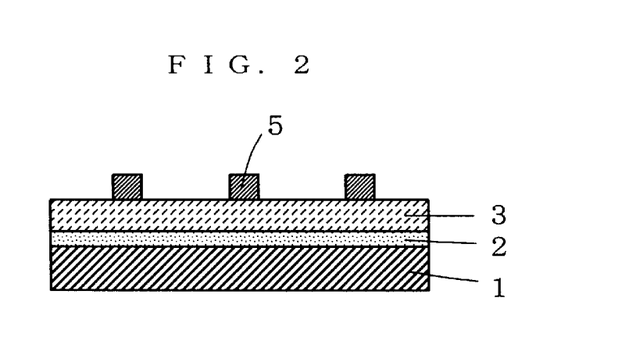
FIG. 2 is a sectional view of another example of the first type of optical waveguide embodying the invention.

An optical waveguide embodying the present invention may have any conventionally known type of structure; that is, it may be of an embedded type, ridge type, or overlay type. FIG. 1 shows an example of the structure of an optical waveguide of an embedded type. In the optical waveguide shown in FIG. 1, on a substrate 1, a primer layer 2 is formed, and then, on top of it, a lower clad layer 3 is formed. On top of this lower clad layer 3, a waveguide layer 5 is selectively formed, and then an upper clad layer 4 is formed so as to cover this waveguide layer 5. How an optical waveguide of an embedded type is manufactured will be described later. Alternatively, as shown in FIG. 2, instead of forming an upper clad layer 4 physically, it is possible to use air as one (a ridge type)

Figure 3:
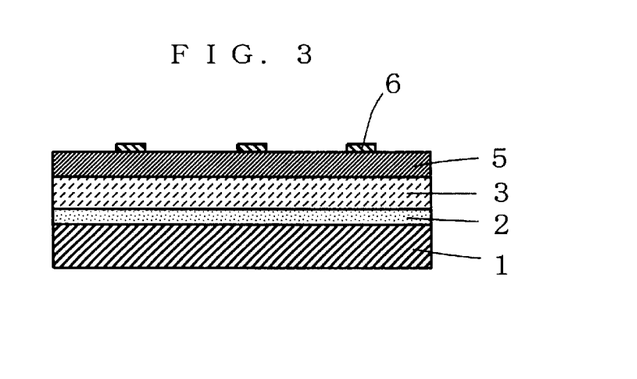
FIG. 3 is a sectional view of still another example of the first type of optical waveguide embodying the invention.

An optical waveguide of an overlay type is either of a dielectric overlay type or of a metal overlay type. The dielectric overlay type exploits the fact that laying a dielectric on a part of a waveguide layer makes the equivalent refractive index of this, dielectric-clad, part of the waveguide layer toward the light guided through it higher than that of its other, air-clad, part. This makes it possible to use the dielectric-clad part of the waveguide layer as a waveguide. On the other hand, the metal overlay type exploits the fact that the equivalent refractive index of a metal-clad part of a waveguide layer toward the light guided through it is lower than that of its other, air-clad, part. This makes it possible to use the air-clad part of the waveguide layer as a waveguide. FIG. 3 shows an example of the structure of an optical waveguide of a dielectric overlay type. In the optical waveguide shown in FIG. 3, between a substrate 1 and a lower clad layer 3, a primer layer 2 is formed, then a waveguide layer 5 is formed all over the lower clad layer 3, and then, as overlays, a dielectric 6 is laid over parts of the waveguide layer 5.

Figure 4:
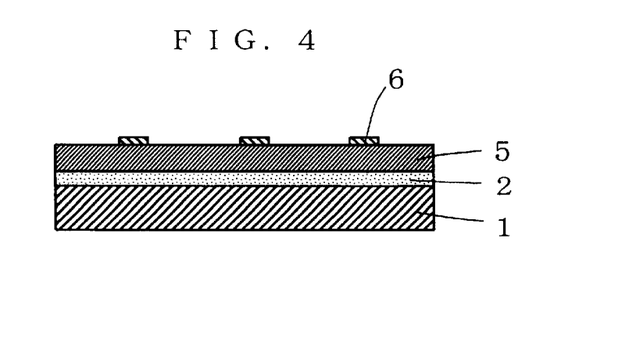
FIG. 4 is a sectional view of an example of a second type of optical waveguide embodying the invention.
Figure 5:
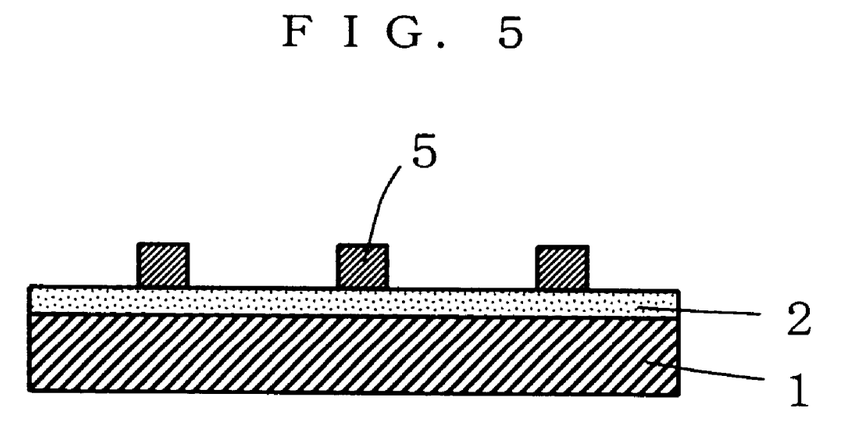
FIG. 5 is a sectional view of another example of the second type of optical waveguide embodying the invention.
Figure 6:
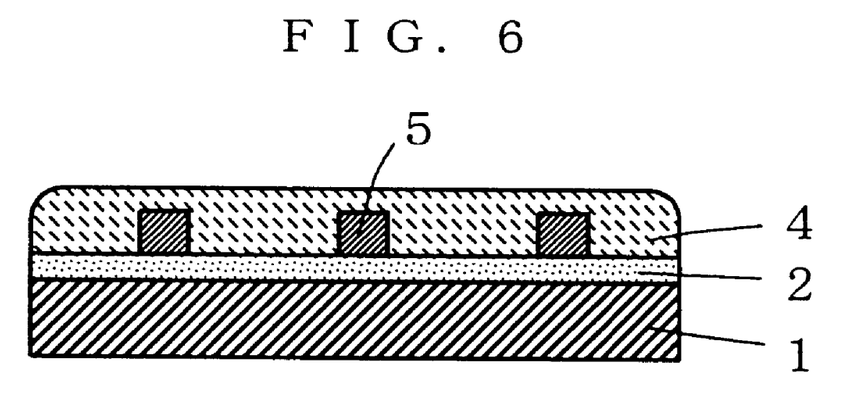
FIG. 6 is a sectional view of still another example of the second type of optical waveguide embodying the invention.

In cases where the primer layer 2 has a low refractive index, the waveguide layer 5 may be formed directly on the primer layer 2. In these cases, optical waveguides have structures as shown in FIGS. 4 to 6.

When an optical waveguide is used in a particular communication band, by letting only light of particular wavelengths pass through it, it is possible to maximize the number of signals transmitted simultaneously, and therefore it is preferable to make the difference in refractive indices between the waveguide layer and the clad layer as small as possible. Accordingly, in this case, it is preferable to adopt an optical waveguide having an embedded-type structure. Now, how an optical waveguide embodying the present invention is manufactured will be described, taking up one having an embedded-type structure as an example.

Figure 7A:
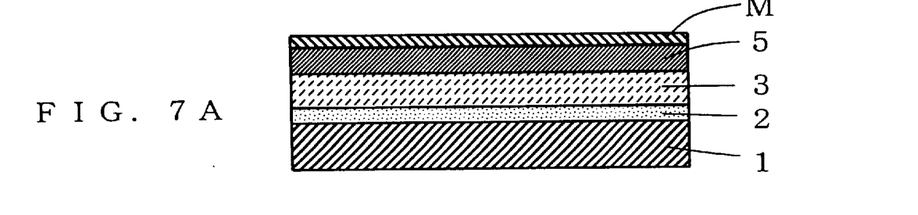
FIGS. 7A to 7F are diagrams showing an example of the manufacturing process of an optical waveguide embodying the invention.

FIGS. 7A to 7F show an example of the manufacturing process of an optical waveguide of an embedded type. As shown in FIG. 7A, first, on top of a substrate 1 of silicone, a precursor solution of a polyimide copolymer for a primer layer is applied by spin coating, and then heat is applied to it to cure the polyimide copolymer and thereby form a primer layer 2. Next, on top, a precursor solution of a polyimide copolymer for a lower clad layer is applied by spin coating, and then heat is applied to it to cure it and thereby form a lower clad layer 3. Next, further on top, in the same manner as when the lower clad layer 3 was formed, a precursor solution of a polyimide copolymer that has a higher refractive index than and exhibits a similar degree of birefringence to the polyimide copolymer used as the lower clad layer 3 is applied and cured to form a waveguide layer 5. Then, on top of this layer 5, a mask layer M for patterning the waveguide layer 5 is formed. Examples of the masking material used here include metals such as Al and Ti, $SiO_2$, spin-on glass (SOG), Si-containing resist, and photosensitive polyimide.

Figure 7B:
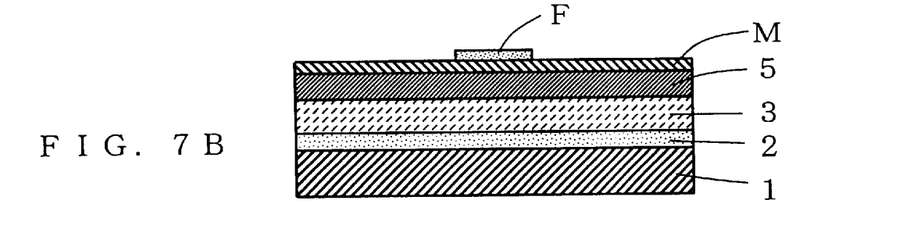
Figure 7C:
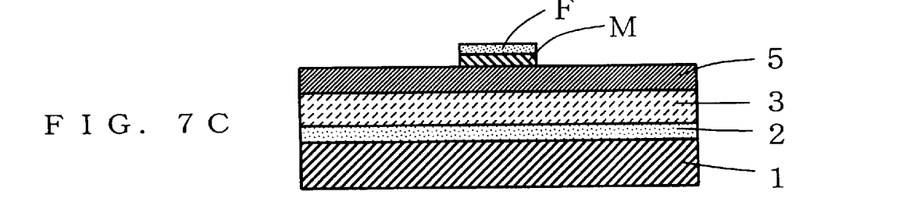
Figure 7D:
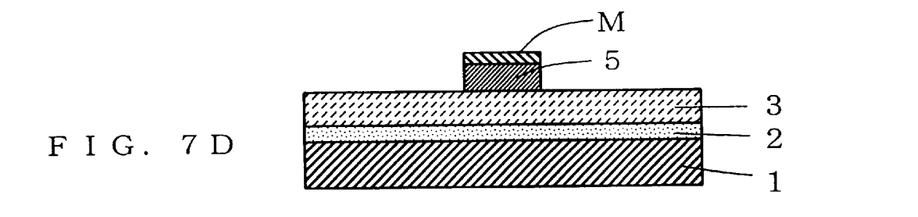
Figure 7E:
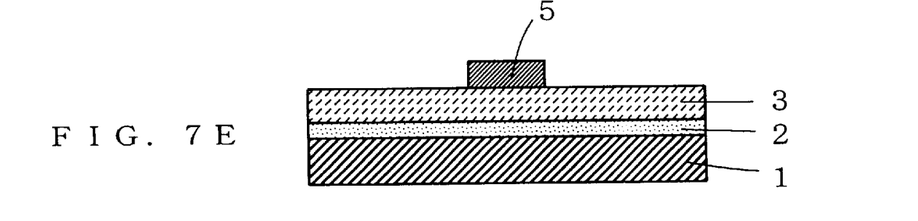
Figure 7F:
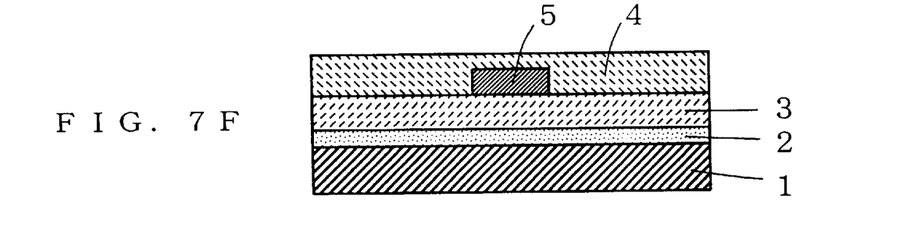

After the formation of the mask layer M, through a series of steps including application of photoresist, pre-baking, exposure, development, and after-baking, a patterned photoresist layer F is formed (FIG. 7B). Next, that part of the mask layer M which is not protected by the photoresist layer F is removed by etching (FIG. 7C), and then that part of the waveguide layer 5 which is not protected by the mask layer M is removed by dry etching (FIG. 7D). In a case where Si-containing resist or photosensitive polyimide is used as the mask layer M, a pattern for patterning the waveguide layer 5 can be formed in the mask layer M, and therefore there is no need to form a photoresist layer F. Next, the remaining mask layer M is removed by dry etching or by using a remover liquid (FIG. 7E). Then, on top, in the same manner as when the lower clad layer 3 was formed, a precursor solution of a polyimide copolymer that has a lower refractive index than and exhibits a similar degree of birefringence to the polyimide copolymer used as the waveguide layer 5 is applied and cured to form an upper clad layer 4 (FIG. 4F).

EXAMPLES

Hereinafter, the present invention will be described more specifically in terms of practical examples. It is to be understood, however, that the present invention is not limited to any of the specific examples described below. For example, although the substrate is made of silicon in these examples, it may be made of any other material, such as glass.

Practical Example 1

On top of a substrate of silicon, polyimide ("PIX-1400" manufactured by HD MicroSystems L.L.C., with a fluorine substitution rate of about 0%, mixed with a coupling agent) was applied by spin coating performed at 800 r.p.m. for 8 seconds and then at 3,000 rev/min for 30 seconds. Then, the thus applied polyimide was subjected to continuous heat treatment at 150° C. for 30 minutes, then at 200° C. for 30 minutes, and then at 350° C. for 60 minutes so as to be cured. The primer layer of polyimide thus formed on the substrate had a thickness of about 2 μm.

Then, on top of this primer layer, a 15 weight % solution in N,N-dimethylacetamide (DMAc) of a polyamide acid that serves as a precursor of a polyimide copolymer (with a fluorine substitution rate of about 47%) having (6FDA/TFDB) and (6FDA/ODA) copolymerized in the ratio of 85:15, was applied by spin coating. This layer was then subjected to heat treatment at 70° C. for 2 hours, then at 160° C. for 1 hour, then at 250° C. for 30 minutes, and then at 350° C. for 1 hour to form a lower clad layer. Next, on top of this lower clad layer, a 15 weight % solution in DMAc of a polyamide acid that serves as a precursor of a polyimide copolymer with a slightly varied copolymerization ratio was applied by spin coating. This layer was then subjected to heat treatment at 70° C. for 2 hours, then at 160° C. for 1 hour, then at 250° C. for 30 minutes, and then at 350° C. for 1 hour to form a waveguide layer. Next, on top of this waveguide layer, an aluminum layer 0.3 $\mu$m thick was vapor-deposited. Then, on top of this aluminum layer, positive-type photoresist was applied by spin coating, and pre-baking was performed at about 95° C. Next, a photomask for patterning the waveguide layer was formed by irradiation of ultraviolet rays by using an extra-high pressure mercury lamp, and was developed by the use of a developer liquid for the positive-type photoresist. Then, post-baking was performed at 135° C. In this way, rectilinear resist patterns each 8 $\mu$m wide were obtained. Next, the aluminum layer was subjected to wet etching to transfer the resist pattern to the aluminum layer. Then, by using the thus patterned aluminum layer as a mask, the polyimide of the waveguide layer was patterned by dry etching. Next, the aluminum layer remaining on the fluorinated polyimide was removed by using an etching liquid. Then, further on top, a 15 weight % solution in DMAc of a polyamide acid that serves as a precursor of the same polyimide copolymer as the lower clad layer was applied by spin coating. This layer was then subjected to heat treatment at 70° C. for 2 hours, then at 160° C. for 1 hour, then at 250° C. for 30 minutes, and then at 380° C. for 1 hour to form an upper clad layer. Lastly, by using a dicing saw, the whole lot was diced into optical waveguide chips each measuring 5×40 mm. FIG. 1 shows a schematic sectional view of the thus manufactured optical waveguide. The results of adherence tests conducted with this optical waveguide are shown in Table 1.

Adherence Tests

The adherence tests were conducted in the following manner:

1. After the dicing using the dicing saw, the edges of the optical waveguide were inspected both visually and under an microscope to check for peeling-off.
2. The optical waveguide was kept at a temperature of 60° C. and at a humidity of 90% for 120 hours in a constant-temperature, constant-humidity chamber, and thereafter the edges of the optical waveguide were both visually and under an microscope to check for peeling-off.

Evaluations were made in three grades, namely "no" for no peeling-off observed, "slight" for slight peeling-off observed at edges, and "obvious" for obvious peeling-off observed.

Practical Example 2

An optical waveguide was produced in the same manner as in Practical Example 1 except that here, in place of the polyimide used in Practical Example 1, a different type of polyimide (manufactured by HD MicroSystems L.L.C., with a fluorine substitution rate of about 5%, mixed with a coupling agent) was used to form the primer layer. With the thus produced optical waveguide, adhesion tests were conducted in the same manner as with Practical Example 1. The results are shown in Table 1.

Practical Example 3

An optical waveguide was produced in the same manner as in Practical Example 1 except that here, in place of the polyimide used in Practical Example 1, a different type of polyimide (manufactured by HD MicroSystems L.L.C., with a fluorine substitution rate of about 10%, mixed with a coupling agent) was used to form the primer layer. With the thus produced optical waveguide, adhesion tests were conducted in the same manner as with Practical Example 1. The results are shown in Table 1.

Practical Example 4

An optical waveguide was produced in the same manner as in Practical Example 1 except that here, in place of the polyimide used in Practical Example 1, a different type of polyimide (manufactured by HD MicroSystems L.L.C., with a fluorine substitution rate of about 0%, containing no coupling agent) was used to form the primer layer. With the thus produced optical waveguide, adhesion tests were conducted in the same manner as with Practical Example 1. The results are shown in Table 1.

Comparative Example 1

Figure 8:
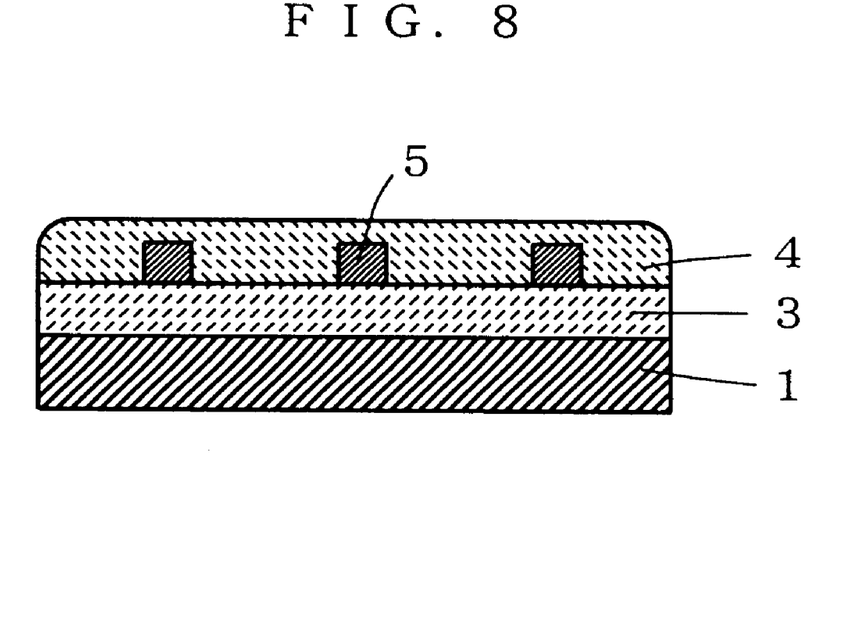
FIG. 8 is a sectional view showing the structure of the optical waveguide of comparative example 1.

An optical waveguide was produced in the same manner as in Practical Example 1 except that here the lower clad layer was formed directly on the substrate. FIG. 8 shows a schematic sectional view of the thus produced optical waveguide. With this optical waveguide, adhesion tests were conducted in the same manner as with Practical Example 1. The results are shown in Table 2.

Comparative Example 2

Figure 9:
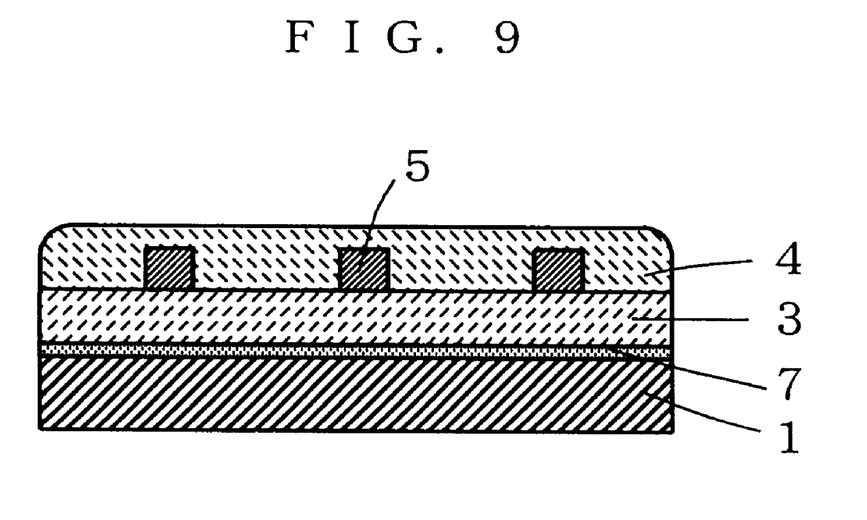
FIG. 9 is a sectional view showing the structure of the optical waveguide of comparative example 2.

On a substrate, first, as a coupling agent for fluorinated polyimide, a zirconium complex was applied and then subjected to heat treatment at 300° C. for 30 minutes to form a coupling agent layer. On top of this layer, a lower clad layer, a waveguide layer, and an upper clad layer were formed successively in the same manner as in Practical Example 1 to produce an optical waveguide. FIG. 9 shows a schematic sectional view of the thus produced optical waveguide. With this optical waveguide, adhesion tests were conducted in the same manner as with Practical Example 1. The results are shown in Table 2.

Comparative Example 3

An optical waveguide was produced in the same manner as in Comparative Example 2 except that here a substrate with increased surface roughness (1,000 Å) was used. With this optical waveguide, adhesion tests were conducted in the same manner as with Practical Example 1. The results are shown in Table 2.

Table 1 shows the following. In the optical waveguides of Practical Examples 1 and 2, in which the primer layer contained as its main ingredient polyimide with fluorine substitution rates of 0% and 5%, respectively, no peeling-off was observed in the lower clad layer either after dicing or after high-temperature, high-humidity testing. In the optical waveguide of Practical Example 3, in which the primer layer contained as its main ingredient polyimide with a fluorine substitution rate of 10%, no peeling-off was observed in the lower clad layer after dicing, but slight peeling-off that could be ignored in practical terms was observed in the lower clad layer after high-temperature, high-humidity testing. Also in the optical waveguide of Practical Example 4, in which the primer layer contained as its main ingredient polyimide with a fluorine substitution rate of 0% and contained no coupling agent, no peeling-off was observed in the lower clad layer after dicing, but slight peeling-off that could be ignored in practical terms was observed in the lower clad layer after high-temperature, high-humidity testing.

On the other hand, Table 2 shows the following. In the optical waveguide of Comparative Example 1, in which the lower clad layer was made of fluorinated polyimide with a fluorine substitution rate of 47% and formed directly on the substrate, peeling-off occurred in the lower clad layer at the edges after dicing, and the lower clad layer separated completely from the substrate after high-temperature, high-humidity testing. In the optical waveguide of Comparative Example 2, in which a coupling agent layer was additionally formed between the lower clad layer and the substrate, slight peeling-off occurred in the lower clad layer at the edges after dicing, and the peeling-off developed to eventually cause the lower clad layer to separate completely from the substrate after high-temperature, high-humidity testing. Also in the optical waveguide of Comparative Example 3, in which the surface roughness of the substrate was increased and a coupling agent layer was additionally formed, as in Comparative Example 2, slight peeling-off occurred in the lower clad layer at the edges after dicing, and the peeling-off developed to eventually cause the lower clad layer to separate completely from the substrate after high-temperature, high-humidity testing.

TABLE 1

|  | Practical Example 1 | Practical Example 2 | Practical Example 3 | Practical Example 4 |
|---|---|---|---|---|
| Primer Layer Fluorine Substitution Rate (%) | 0 | 5 | 10 | 0 |
| Coupling Agent Mixed | Yes | Yes | Yes | No |
| Peeling-off After Dicing | No | No | No | No |
| Peeling-off After High-Temperature High-Humidity Testing | No | No | Slight | Slight |

TABLE 2

|  | Comparative Example 1 | Comparative Example 2 | Comparative Example 3 |
|---|---|---|---|
| Lower Clad Layer Fluoride Substitution Rate (%) | 47 | 47 | 47 |
| Coupling Agent Layer Added |  | Yes | Yes (with increased surface roughness) |
| Peeling-off After Dicing | Obvious | Slight | Slight |
| Peeling-off After High-Temperature High-Humidity Testing | Obvious | Obvious | Obvious |

What is claimed is:

1. An optical waveguide comprising:
   a substrate;
   a primer layer formed on the substrate; and
   a waveguide layer formed on the primer layer,
   wherein the primer layer contains as a main ingredient thereof polyimide with a fluorine substitution rate of 10% or lower (including 0%) and the waveguide layer contains as a main ingredient thereof polyimide with a fluorine substitution rate of 30% or higher.

2. An optical waveguide as claimed in claim 1,
   wherein the waveguide layer is formed selectively on the primer layer.

3. An optical waveguide as claimed in claim 2, further comprising:
   a clad layer formed on the primer and waveguide layers,
   wherein the clad layer contains as a main ingredient thereof polyimide with a fluorine substitution rate of 30% or higher.

4. An optical waveguide as claimed in claim 1, further comprising:
   an overlay layer formed selectively on the waveguide layer.

5. An optical waveguide as claimed in claim 1,
   wherein the primer layer has a thickness in a range from 0.1 to 20 μm.

6. An optical waveguide as claimed in claim 1,
   wherein the primer layer contains a coupling agent.

7. An optical waveguide comprising:
   a substrate;
   a primer layer formed on the substrate; and
   a clad layer formed on the primer layer and having a waveguide layer,
   wherein the primer layer contains as a main ingredient thereof polyimide with a fluorine substitution rate of 10% or lower (including 0%) and the waveguide layer contains as a main ingredient thereof polyimide with a fluorine substitution rate of 30% or higher.

8. An optical waveguide as claimed in claim 7,
   wherein the waveguide layer is formed selectively on the clad layer.

9. An optical waveguide as claimed in claim 7,
   wherein the clad layer consists of a lower clad layer formed on the primer layer and an upper clad layer formed on the lower clad layer, and the waveguide layer is laid selectively between the lower and upper clad layers.

10. An optical waveguide as claimed in claim 7, further comprising:
    an overlay layer formed selectively on the waveguide layer.

11. An optical waveguide as claimed in claim 7,
    wherein the primer layer has a thickness in a range from 0.1 to 20 μm.

12. An optical waveguide as claimed in claim 7,
    wherein the primer layer contains a coupling agent.

13. A method of manufacturing an optical waveguide, comprising:
    a step of forming a primer layer on a substrate;
    a step of forming a lower clad layer on the primer layer; and
    a step of forming a waveguide layer selectively on the lower clad layer,
    wherein the primer layer contains as a main ingredient thereof polyimide with a fluorine substitution rate of 10% or lower (including 0%) and the lower clad layer and the waveguide layer contain as a main ingredient thereof polyimide with a fluorine substitution rate of 30% or higher.

14. A method of manufacturing an optical waveguide as claimed in claim 13, further comprising:
    a step of forming an upper clad layer so as to cover the lower clad and waveguide layers.

15. A method of manufacturing an optical waveguide as claimed in claim 13,
    wherein the primer layer has a thickness in a range from 0.1 to 20 μm.

16. A method of manufacturing an optical waveguide as claimed in claim 13,
    wherein the primer layer contains a coupling agent.

17. An optical waveguide comprising:

a substrate;

a primer layer formed on the substrate;

a first clad layer formed on the primer layer; and a waveguide layer formed on the first clad layer, wherein the primer layer comprises fluorinated polyimide having a fluorine substitution rate of up to 10% and the waveguide layer comprises fluorinated polyimide having a fluorine substitution rate of 30% or higher.

18. An optical waveguide as claimed in claim 17, wherein the waveguide layer is patterned.

19. An optical waveguide as claimed in claim 17, further comprising:

a second clad layer formed on the waveguide layer.

20. An optical waveguide as claimed in claim 17, further comprising:

a patterned overlay layer formed on the waveguide layer.

21. An optical waveguide as claimed in claim 17, wherein the primer layer has a thickness in a range from 0.1 to 20 $\mu$p.m.

22. An optical waveguide as claimed in claim 17, wherein the primer layer contains a coupling agent.

23. An optical waveguide as claimed in claim 17, wherein the fluorine substitution rate of the primer layer is 5% or lower.

24. An optical waveguide as claimed in claim 1, wherein the fluorine substitution rate of the primer layer is 5% or lower.

25. An optical waveguide as claimed in claim 7, wherein the fluorine substitution rate of the primer layer is 5% or lower.

26. An optical waveguide as claimed in claim 13, wherein the fluorine substitution rate of the primer layer is 5% or lower.

* * * * *